Nov. 5, 1957     E. LAMMERZ ET AL     2,811,863
DRIVE FOR VEHICLES, ESPECIALLY FOR RAIL VEHICLES, WITH
HYDRAULIC POWER TRANSMISSION
Filed July 29, 1954     2 Sheets-Sheet 1
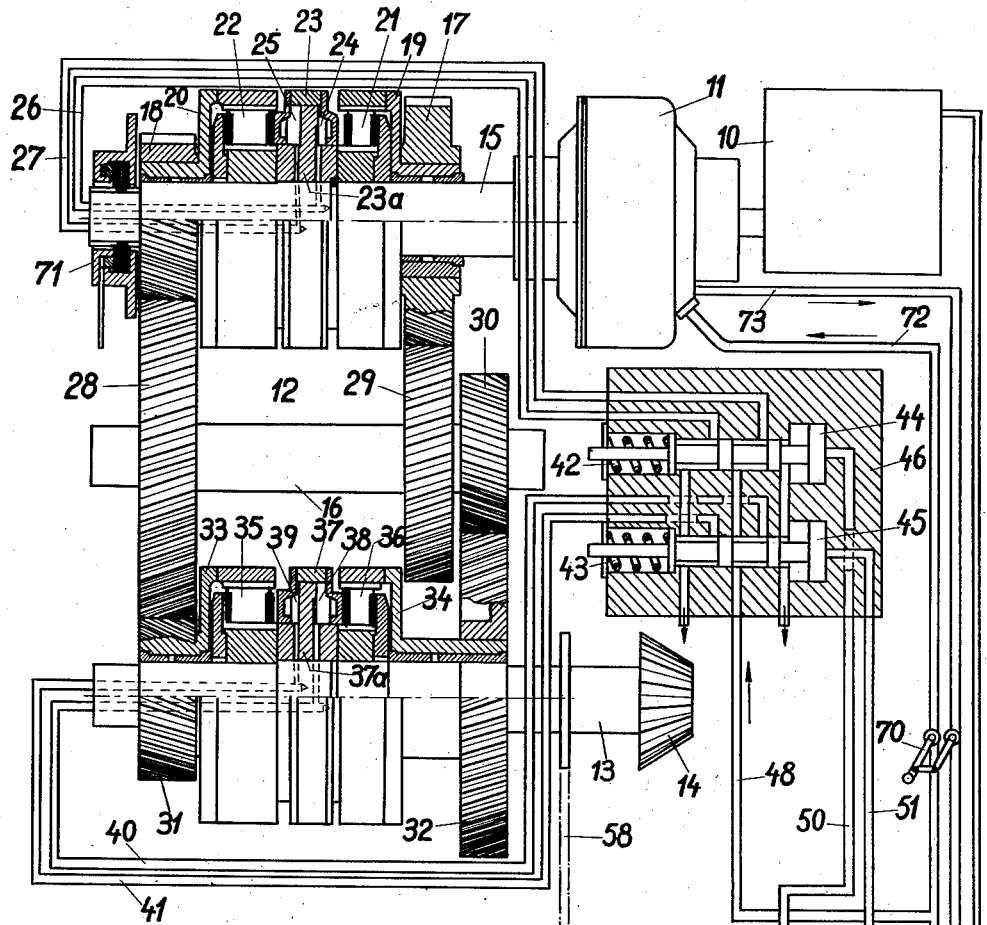
Fig.1
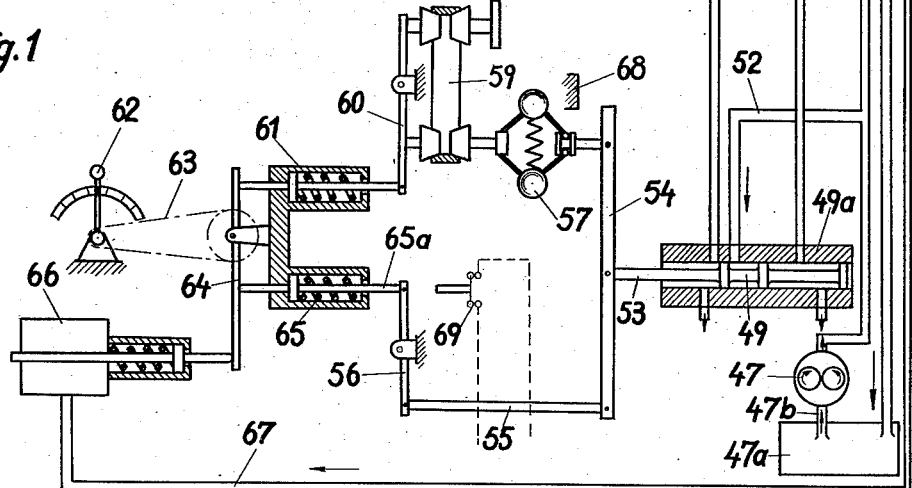
Inventors: Ernst Lammerz
and
Hans Mehring
By [signature]
Patent Agent Nov. 5, 1957 — E. LAMMERZ ET AL — 2,811,863
DRIVE FOR VEHICLES, ESPECIALLY FOR RAIL VEHICLES, WITH HYDRAULIC POWER TRANSMISSION
Filed July 29, 1954

Inventors:
Ernst Lammerz
and
Hans Mehring

United States Patent Office 2,811,863
Patented Nov. 5, 1957

2,811,863

DRIVE FOR VEHICLES, ESPECIALLY FOR RAIL VEHICLES, WITH HYDRAULIC POWER TRANSMISSION

Ernst Lammerz and Hans Mehring, Essen, Germany, assignors to Aktiengesellschaft für Unternehmungen der Eisen- und Stahlindustrie, Essen, Germany Application July 29, 1954, Serial No. 446,507

Claims priority, application Germany August 1, 1953

3 Claims. (Cl. 74—472)

The present invention relates to a drive for vehicles, especially rail vehicles, with hydraulic power transmission.

In order, when driving vehicles with hydraulic power transmission, to be able to drive at great efficiency within as great a velocity range as possible, the respective transmissions are usually provided with a plurality of successively effective velocity ranges. The speed change may be effected in a hydraulic manner, for instance by changing the function of individual circuit parts or alternately filling and discharging a plurality of circuits. The speed change may also be effected mechanically, e. g. by actuating shiftable clutches or brakes in change gear transmissions. The speed change is preferably effected automatically either in conformity with the driving speed or preferably in accordance with the relationship between the vehicle speed and the speed of rotation of the driving engine.

Partial loads are generally obtained by reducing the speed of the driving engine. Inasmuch as with larger vehicle motors, the smallest possible speed of rotation is approximately 50% of the speed of rotation under full load, and since the tractive force is proportional to the second power of this speed of rotation, it is possible in this way to obtain a decrease in the tractive force to approximately 25% of that under full load. This range is generally sufficient for the normal driving range. Different conditions of operation such as the slow switching with low loads, the connection of a locomotive driving alone to a train, or the shifting of the reversing gear, however, require a considerably greater reduction of the tractive force. For instance, the maximum obtainable tractive force of a locomotive with 50 tons adhesive weight lies at approximately 16,000 kilograms, whereas the driving resistance of the engine driving slowly alone lies at approximately 500 kilograms, i. e. less than 3% of the maximum value.

In order to obtain such a reduction in the tractive forces, heretofore various methods have been employed such as a partial discharge of the circuits, a partial disconnection of the turbine wheel from the circuits, the insertion of a locking ring or of an additional blade rim or a shifting of the blades of the pump or guide wheel. Such operations, however, require the employment of complicated torque converter designs. Furthermore, most of these methods amount to a temporary complete interruption of the power flow which brings about a jerky operation.

It is, therefore, an object of this invention to provide a driving arrangement for vehicles, especially rail vehicles, which will overcome the above mentioned drawbacks.

It is another object of this invention to provide a drive for vehicles, especially rail vehicles, which, while employing a hydraulic power transmission, will make it possible to reduce the tractive force of the vehicle considerably for operating the vehicle under low load without complicating the hydraulic power transmission.

A still further object of this invention consists in the provision of a drive of the type set forth in the preceding paragraphs, which will not interfere with the automatic shifting of the various velocity ranges of such drive when the vehicle operates under full load.

These and other objects and advantages of the invention will appear more clearly from the following specification in connection with the accompanying drawings, in which:

Fig. 1 is a diagrammatic illustration, partly in view and partly in section of a drive according to the present invention for use in connection with a rail vehicle.

Figure 2:
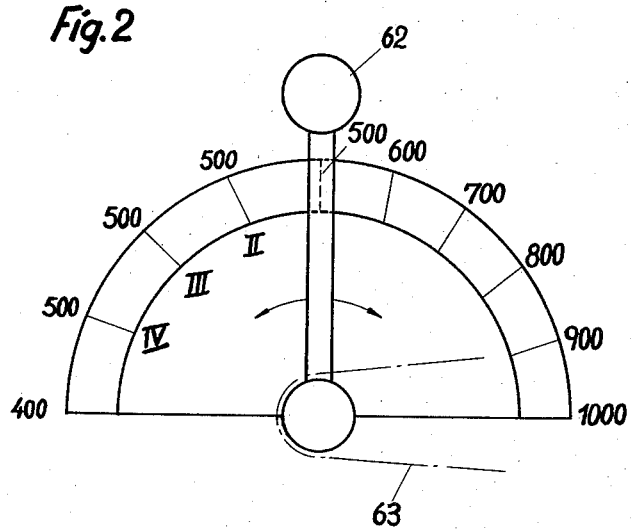
Fig. 2 illustrates the range of operation of a manually operable control lever in connection with a drive through a transmission train having four velocity ranges.

With drives of the type mentioned above, the present invention represents a new solution to the problem to reduce the tractive forces when driving under partial load. This solution allows the employment of normal turbo circuits (torque converter or couplings) and is free from the drawbacks outlined above. The invention consists in that in order to reduce the tractive forces, the various velocity ranges can be shifted at random when driving under partial load, for instance at the lowest possible power output of the driving engine.

In this way, it is possible for instance with a four-velocity range transmission respectively having transmission steps of 1:2, i. e. a transmission of 1:8 between the first and the fourth velocity range, to reduce the tractive force up to the eighth portion of 25% which means approximately 3% of the maximum value by shifting to the fourth velocity range at half the speed of the driving engine. This value is rather close to the value obtainable with torque converters having adjustable blades. In this connection a normal torque converter may serve as circuit. The graph of efficiency of said converter must merely be so flat as to allow a gear step of 1:2 with a useful degree of efficiency. In further development of the invention, at least the highest velocity range serves merely to reduce the tractive forces when driving under partial load. It is not enclosed in a possibly available velocity range automatic system but can be shifted at random and, therefore, need naturally be dimensioned only for the small output of the driving engine as required in this connection.

The invention is also applicable in connection with other steps for reducing the tractive forces for instance with the throwing in of a transmission brake or the lowering of the hydraulic pressure in the circuit. When driving a plurality of axles or axle groups of the vehicle independently from each other through a separate transmission train, also in an effort further to reduce the tractive forces, these transmission trains may be disconnected individually.

If each transmission train is provided with a separate hydraulic power transmission, through the intervention of which it is driven by a driving engine common to said transmission trains, it can be disconnected in a manner known per se by discharging or interrupting the respective liquid circuit (by means of annular slides, adjustable blades etc.).

If for instance two vehicle axles or axle groups are driven by a diesel engine through two separate transmission trains each of which has a torque converter and a subsequent three-velocity range transmission with steps of 1:2, it is possible in this manner to reduce the tractive force to approximately 3% of the maximum value, similar to that of the first example. This is brought about by reducing the tractive force to 25% by halving the speed of rotation of the engine, furthermore by shifting from the first to the third velocity range whereby the tractive force is reduced to a fourth, i. e. to 6.25%, and finally is reduced by a further 50% by disconnecting one of the transmission trains.

Inasmuch as the fine control of the tractive forces is not intended for the driving technique on the open railroad track but merely for switching at low loads, for connecting the locomotive to the train etc., the described shifting of the velocity ranges or the disconnection of individual transmission trains is made possible only below a certain driving speed whereas when said speed is exceeded, all transmission trains can be made effective only by an automatic velocity shifting mechanism. During the fine control operation, the selection of the higher velocity range and, if desired, the disconnection of the individual transmission trains is effected successively by moving the control lever, which controls the speed of the driving engine in the normal range of operation, from a certain or neutral position, which corresponds to the lowest speed of the driving engine with thrown-in velocity ranges, and in opposite direction through various additional positions into the idling position.

Referring now to the drawing in detail and Fig. 1 thereof in particular, the drive shown therein intended for a rail vehicle comprises a diesel engine 10 which through the intervention of a hydraulic torque converter 11 and a four-velocity transmission 12 drives the output shaft 13. This shaft 13 is provided with a bevel gear 14 for engagement with a gear system (not shown) for driving the axle or axles of a rail vehicle. The input shaft of the transmission 12 is represented by the shaft 15 which simultaneously serves as turbine shaft of the torque converter 11. The transmission 12 furthermore comprises an intermediate shaft 16 and the said output shaft 13.

Rotatably mounted on shaft 15 are gears 17 and 18 with coupling cages 19 and 20 respectively which pertain to corresponding disc clutches 21 and 22 respectively. The disc clutches 21 and 22 are adapted alternately to be thrown in or taken out by means of a control cylinder 23 having slidably mounted therein a piston 23a which is fixedly connected to the shaft 15. The cylinder 23 forms with both sides of the piston 23a two chambers 24, 25 respectively which are adapted to be supplied with fluid under pressure through corresponding conduits 26, 27 respectively.

Gears 28, 29 and 30 are fixedly connected to the intermediate shaft 16, the arrangement being such that the gear 28 continuously meshes with gear 18, while the gear 29 is in permanent meshing engagement with the gear 17. Similar to the arrangement of gears 17 and 18 on shaft 15, there are rotatatably mounted on the output shaft 13 gears 31 and 32 with the coupling cages 33 and 34, disc clutches 35 and 36 and a control cylinder 37, said gears 31 and 32 meshing with the gears 28 and 30. The control cylinder 37 is similar to the control cylinder 23 axially displaceable by means of fluid under pressure selectively supplied to the pressure chamber 38 or 39 through feeding conduits 40 and 41 respectively.

The control of the individual velocity ranges of the transmission is effected by means of piston spools 44 and 45 arranged in a distributing casing 46 common to both of said spools. Said spools are continuously urged by pressure springs 42 and 43 respectively to move into their right-hand positions with respect to Fig. 1. By means of the spools 44, 45 the pressure fluid means conveyed to the distributing casing 46 by a pump 47 is distributed to two pairs of conduits namely 26, 27 and 40, 41 respectively. The piston controlled spools 44 and 45 are controlled hydraulically by fluid conveyed to the pistons 44 and 45 through conduits 50 and 51 respectively. The conduits 50 and 51 in their turn are controlled by a valve spool 49 reciprocably mounted in a valve casing 49a which latter receives fluid under pressure from pump 47 through the feeding line 52. The pump 47 also feeds the circuit of the torque converter 11 through a feeding line 72, whereas the conduit 73 returns the fluid from the torque converter 11 to a reservoir 47a into which extends the suction line 47b of the pump 47.

The control spool 49 is linked through a rod 53 to an intermediate point of a transverse lever 54. One end of the transverse lever 54 is through the intervention of link 55 connected to one end of a two-arm lever 56, while the other end of transverse lever 54 is connected to a sleeve of a centrifugal governor 57. The governor 57 is actuated by the output shaft 13 through the intervention of a chain drive 58 and belt drive 59 with an infinitely variable transmission ratio. The adjustment of the transmission ratio of the belt drive 59 is effected by a two-arm lever 60 which through a pressure spring 61 is non-positively connected with the control lever 64. This control lever 64 is actuated by a manually operable control lever 62 through a chain drive 63. The control lever 64 furthermore controls the two-arm lever 56 in conformity with the shifting direction of the lever 62 in one or the other direction. A pressure spring 65 continuously urges the link 65a linked to the lever 56 into contact with the lever 64. The control lever 64 additionally controls the adjustment of the injection pump 66 of the diesel engine 10 which pump is connected to the diesel engine 10 by means of the fuel feeding line 67.

Figure 3:
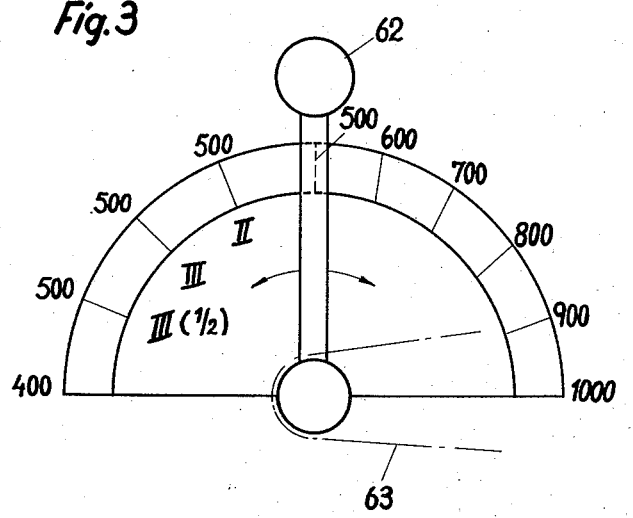
Fig. 3 illustrates the same as in Fig. 2 but in connection with a drive through two separate trains each having three velocity ranges.

The drive according to the invention operates in the following manner: when the control lever 62 is moved by the operator in counter-clockwise direction from its intermediate position shown in the drawing, the control lever 64 will through the chain drive 63 likewise be tilted in counter-clockwise direction while neither the transmission of the belt drive 59 and thus the governor 57 nor the setting of the fuel pump 66 is changed so that the diesel engine 10 which is assumed to be running will continue to run at its constant speed of 500 R. P. M. This situation is illustrated in Fig. 2 for a transmission with one transmission train and four velocity ranges, and is also illustrated in Fig. 3 for a transmission with two transmission trains and three velocity ranges. In Fig. 3 the position III (1/2) indicates the throwing in of the third velocity range while simultaneously taking out one of the two transmission trains. The farther the control lever 62 is moved in counter-clockwise direction, the farther will in conformity with Fig. 1 the valve spool 49 be moved toward the left through the intervention of the lever 64, the two-arm lever 56, link 55, transverse lever 54 and rod 53. In this way the four velocity transmission 12 is shifted successively from the first to the last velocity range. When the control lever 62 occupies its left-hand end position with regard to the drawing, the electric switch 69 may be closed through the intervention of the lever 56 whereby a second transmission train not shown may be made ineffective.

When the control lever 62 is moved in clockwise direction so that the lever 64 will likewise be tilted in clockwise direction, the lever 56 serving for any desired change in the velocity range, and also the link 55 remain unaffected, whereas on the other hand the injection pump 66 will be adjusted thereby changing the speed of the engine 10 in conformity with the adjustment of the lever 62. Furthermore through the intervention of the two-arm lever 60, the transmission of the belt drive 59 is adjusted in such a manner that the governor 57 in conformity with both the speed of the engine 10 and the speed of the output shaft 13 will adjust the valve spool 49 through the transverse lever 54 and rod 53, thereby bringing about an automatic shifting from one velocity range to another velocity range.

In the position shown in Fig. 1, the first speed has been thrown in. This will be evident from the following. Pump 47 delivers fluid under pressure through conduit 48 to the distributing casing 46 in which the two spools 44 and 45 occupy their right-hand end position. From the casing 46 the pressure fluid passes into the feeding lines 27 and 40. From here the pressure fluid passes to the chambers 25 and 38 respectively whereby the control cylinder 23 is pressed against the discs of the clutch 22, while the control cylinder 37 is pressed against the discs of clutch 36. Consequently the gear 18 is clutched to the input shaft 15 of the change gear transmission 12, whereas the gear 32 is clutched to the output shaft 13. The power flow through the transmission is therefore effected through shaft 15, gear 18, gear 28, shaft 16, gear 30, gear 32 and from there to the output shaft 13 drivingly connected with the driving axle of the vehicle.

When shifting from the first velocity range to the second velocity range, the spool 49 is in one of the two ways described above moved toward the left to such an extent that a connection is established between the conduit 52 communicating with the pressure side of pump 47, and the conduit 50 leading to the spool 44 in the distributor casing 46. As a result thereof, the spool 44 is moved into its left-hand end position against the thrust of the pressure spring 42. Thus, the pressure in conduit 27 is released and the conduit 26 receives fluid under pressure. Consequently now the chamber 24 is supplied with fluid under pressure so that the control cylinder 23 moves toward the right against the discs of clutch 21 thereby establishing driving connection between the gear 17 and the shaft 15 while the driving connection of the gear 18 with shaft 15 is interrupted. Thus, the shaft 15 now drives the output shaft 13 through the gears 17, 29, 30, and 32.

To shift from the second velocity range to the third velocity range, the control spool 49 is moved further toward the left so that a connection is established between the conduit 52 connected to the pressure side of pump 47, and the conduit 51 leading to the spool 45 in the distributing casing 46. The pressure in conduit 50 is then released so that the pressure spring 42 returns the spool 44 toward its right-hand end position. In this position the pressure in conduits 26 and 40 is released. The pressure acting upon the piston of the spool 45 moves the latter into its left-hand end position against the thrust of the pressure spring 43. The pressure fluid delivered by pump 47 now passes through conduit 48 and casing 46 on one hand into the conduit 27 and on the other hand into the conduit 41. Consequently pressure builds up in chambers 25 and 39 so that the cylinders 23 and 37 respectively act upon the disc clutches 22 and 35 to make the same effective, thereby bringing about a driving connection between shaft 15 and gear 18 and between shaft 13 and gear 31. Consequently shaft 15 now drives the output shaft 13 through the gears 18, 28 and 31.

Finally in order to shift from the third velocity range to the fourth velocity range, the control spool 49 is moved into its outermost left-hand position with regard to the drawing so that the pressure conduit 52 will at the same time communicate with both the conduit 50 and 51. Consequently both spools 44 and 45 are moved toward their left-hand end positions against the thrusts of springs 42 and 43. The pressure fluid delivered by pump 47 into conduit 48 will then pass into conduits 26 and 41 whereas the pressure in the conduits 27 and 40 will be released. Pressure will then prevail into the chambers 24 and 39 so that the cylinders 23 and 37 will throw in the clutches 21 and 35 respectively thereby establishing driving connection between the gear 17 and shaft 15 and between the gear 31 and shaft 13. Shaft 15 thus drives shaft 13 through gears 17, 29, 28 and 31.

It should be noted that the first velocity range can be thrown in through the link system 65, 55, 53, which means that it can be thrown in at the lowest motor speed only, whereas the automatic shifting from the governor 57 is limited to the first three velocity ranges due to an abutment 68 which is arranged for abutment with the transverse lever 54.

The arrangement according to the invention also comprises a pressure control operable by a lever 70 which may be used to effect the pressure of the fluid circulating in the torque converter 11 which pressure is likewise produced by the pump 47. In this way a further reduction in the tractive force can be obtained. Additionally there may be provided a hydraulically operable brake 71 for acting upon the gear transmission.

Figs. 2 and 3 diagrammatically illustrate the range of operation of a control lever with the individual intermediate positions.

Within the normal range of operation (right half in Figs. 2 and 3) the output is controlled in the customary manner by adjusting the speed of the driving engine, while the velocity ranges are shifted automatically in conformity with the respective driving speed. In a particular starting range between the hitherto neutral position (center), which latter corresponds to the lowermost speed of the driving engine with thrown-in velocity ranges, and the idling position (left in Figs. 2 and 3), the "fine control" of the tractive forces is effected by selection of the higher velocity ranges. This is effected in the sequence visible from said figures, according to Fig. 3 additionally by disconnecting one of the separate transmissions leading to the two individually driven axles or axle groups, this disconnection being effected at constant lowest working speed of the driving engine.

The roman figures in Figs. 2 and 3 correspond to the different velocity ranges while the Arabic figures indicate the speed of the driving engine per minute. The lowest speed when idling is assumed to be 400 R. P. M. and when the velocity ranges are thrown in is assumed to be 500 R. P. M. The highest speed is assumed to be 1000 R. P. M. As has been mentioned above, the fraction ½ in Fig. 3 indicates the disconnection of one of the two transmission trains.

It is, of course, understood that the present invention is, by no means, limited to the particular arrangement described herein and illustrated in the drawings but also comprises any modifications within the scope of the appended claims.

What we claim is:

1. In combination with a drive for vehicles, especially rail vehicles, having a hydraulic power transmission and a gear transmission including a plurality of shiftable velocity ranges: fluid operable shifting means associated with said velocity ranges and operable selectively to make the same effective or ineffective, fluid operable control means arranged for fluid communication with said shifting means to control the supply of pressure fluid thereto and the release of fluid therefrom, mechanically operable fluid flow control means including a movable member and arranged to control the supply of pressure fluid to and the release of fluid from said fluid operable control means, a first two-arm lever having its pivot point linked to said movable member, governor means arranged for driving connection with said gear transmission and having movable means linked to one arm of said first two-arm lever for tilting the same about said pivot point in either direction, first link means operatively connected to the other arm of said first two-arm lever and operable to tilt the latter in either direction, infinitely variable transmission means arranged for drivingly connecting said gear transmission with said governor means, second link means operatively connected to said infinitely variable transmission means for adjusting the same, a second two-arm lever having one arm arranged for actuating said first link means and having its other arm arranged for actuating said second link means, an internal combustion engine drivingly connected to said hydraulic power transmission, and fuel feeding means operable by the other arm of said second two-arm lever for feeding fuel to said engine, the arrangement being such that said fuel feeding means and said second link means are actuated in response to the movement of said second two-arm lever in one direction only, whereas said first link means is operable by said second two-arm lever in response to the tilting movement of the latter in the other direction only.

2. In combination with a drive for vehicles, especially rail vehicles, having a hydraulic power transmission including a plurality of shiftable velocity ranges, and an internal combustion engine drivingly connected to said hydraulic power transmission: shifting means associated with said velocity ranges and operable selectively to make the same effective or ineffective, engine speed regulating means associated with said internal combustion engine and operable selectively for feeding fuel to said engine, a manually operable control member which is movable from a certain position corresponding to the minimum working speed of said engine in one direction over a normal range of movement in which it is operatively connected with said engine speed regulating means thereby effecting an increase of said engine speed, said control member also being movable from said certain position in opposite direction into various additional positions in which it is operatively connected with said shifting means thereby successively selecting the higher velocity ranges while maintaining the minimum working speed of said engine.

3. In combination with a drive for vehicles, especially rail vehicles, having a hydro-mechanical power transmission including an output shaft and a plurality of shiftable velocity ranges, and an internal combustion engine drivingly connected to said power transmission: shifting means associated with said velocity ranges and operable selectively to make the same effective or ineffective, governor means arranged for driving connection with said output shaft and arranged for actuating said shifting means thereby selecting said velocity ranges automatically in response to the speed of said output shaft, engine speed regulating means associated with said internal combustion engine and operable selectively for feeding fuel to said engine, a manually operable control member movable from a certain position corresponding to the minimum working speed of said engine in one direction over a normal range of movement in which it is operatively connected with said engine speed regulating means thereby effecting an increase of said engine speed, said control member also being movable from said certain position in opposite direction into various additional positions in which it is operatively connected with said shifting means thereby successively selecting the higher velocity ranges while maintaining the minimum working speed of said engine.

References Cited in the file of this patent
UNITED STATES PATENTS

| | | |
|---|---|---|
| 2,103,540 | Livermore | Dec. 28, 1937 |
| 2,120,104 | Livermore | June 7, 1938 |
| 2,603,943 | Evernden | July 22, 1952 |
| 2,609,706 | Jandasek | Sept. 9, 1952 |
| 2,658,413 | Orr et al. | Nov. 10, 1953 |